United States Patent
Fujii

(10) Patent No.: US 9,459,618 B2
(45) Date of Patent: Oct. 4, 2016

(54) INSTRUMENT CONTROLLING DEVICE AND INSTRUMENT CONTROLLING METHOD

(71) Applicant: Azbil Corporation, Tokyo (JP)

(72) Inventor: Toshihisa Fujii, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 389 days.

(21) Appl. No.: 14/192,090

(22) Filed: Feb. 27, 2014

(65) Prior Publication Data

US 2014/0244005 A1 Aug. 28, 2014

(30) Foreign Application Priority Data

Feb. 28, 2013 (JP) ................................. 2013-039488

(51) Int. Cl.
*G05B 9/02* (2006.01)
*G05B 19/418* (2006.01)

(52) U.S. Cl.
CPC ............ *G05B 19/41855* (2013.01); *G05B 2219/31334* (2013.01); *Y02P 90/16* (2015.11); *Y02P 90/185* (2015.11)

(58) Field of Classification Search
CPC ............................................ G05B 19/41855
See application file for complete search history.

(56) References Cited

U.S. PATENT DOCUMENTS

| 7,003,577 B1* | 2/2006 | Ueda | H04L 12/2803 709/218 |
| 7,024,501 B1* | 4/2006 | Wright | A63F 13/02 710/14 |
| 2005/0210207 A1* | 9/2005 | Sekine | G06F 11/325 711/154 |
| 2014/0149563 A1* | 5/2014 | Ono | H04L 41/0846 709/222 |
| 2015/0263909 A1* | 9/2015 | Okubo | H04L 43/10 709/224 |

FOREIGN PATENT DOCUMENTS

JP 2009-205243 A 9/2009

* cited by examiner

*Primary Examiner* — Philip Wang
(74) *Attorney, Agent, or Firm* — Troutman Sanders LLP

(57) ABSTRACT

An instrument controlling device includes an instrument information storing portion that stores instrument information, a receiving portion that receives an alert event, a first evaluating portion that evaluates whether an address of an instrument that produced the alert event matches any of the addresses in the instrument information that is stored if the alert event is an installation event, a second evaluating portion that evaluate whether instrument identifying information of device information matches identifying information of the alert event if the address matched, a selection requesting portion that requests, from an administrator, a selection as to whether or not to update the instrument information using the instrument identifying information of the alert event if the instrument identifying information does not match, and an updating portion that updates the instrument information using the instrument identifying information of the alert event if a selected instruction is an updating instruction.

2 Claims, 3 Drawing Sheets

FIG. 2

| Configuration Information ||||||||
| Instrument Identifying Information | Address Information | Revision No. | Parameter (1) || ... | Parameter (n) ||
| | | | ID (1) | Value (1) | | ID (n) | Value (n) |
| --- | --- | --- | --- | --- | --- | --- | --- |
| A0001 | 001.001.001 | 00010 | P001 | 999 | ... | P00n | 999 |
| B0001 | 001.001.002 | 00016 | P013 | 999 | ... | P00n | 999 |
| C0001 | 001.001.003 | 00008 | P009 | 999 | ... | P00n | 999 |
| D0001 | 001.002.001 | 00021 | P004 | 999 | ... | P00n | 999 |
| ... | ... | ... | ... | ... | ... | ... | ... |

INSTRUMENT CONTROLLING DEVICE AND INSTRUMENT CONTROLLING METHOD

CROSS REFERENCE TO RELATED APPLICATION

This application claims priority under 35 U.S.C. §119 to Japanese Patent Application No. 2013-039488, filed on Feb. 28, 2013, the entire content of which being hereby incorporated herein by reference.

FIELD OF TECHNOLOGY

The present invention relates to an instrument controlling device and an instrument controlling method.

BACKGROUND

In a work area wherein production processes are controlled, large numbers of instruments (for example, sensors and devices such as valve positioners) are located throughout the plant in order to control the processes. In a system for controlling these instruments, the instrument information regarding each individual instrument is collected into a controlling device for centralized control. However, when an instrument has been swapped by the production floor side where the instrument is installed, without notifying the administrator, then there will be a discrepancy between the instrument information that is controlled by the controlling device and the instrument information for the instrument that is installed on the production floor, which may become an impediment to control. For example, in the control system set forth in Japanese Unexamined Patent Application Publication No. 2009-205243 ("the JP '243"), if there is a difference between instrument information that is obtained for an individual instrument and instrument information that is controlled by the controlling device, the controlling device updates, with the instrument information that has been obtained from the instrument, the instrument information that is controlled.

In the control system set forth in the JP '243 above, when, for example, an instrument has been swapped by the production floor side on its own, a state wherein there is a discrepancy in the instrument information between the controlling device and the instrument will continue until the controlling device obtains instrument information from the instrument after the swap, to update that information, and thus there is room for improvement.

The present invention was created in order to solve the problems in the conventional technology set forth above, and an aspect thereof is to provide an instrument controlling device and instrument controlling method able to update, easily and promptly, the instrument information controlled by the system even when an instrument has been swapped without notifying the administrator.

SUMMARY

An instrument controlling device according to the present invention controls instrument information pertaining to a plurality of instruments that are connected to a system that is subject to control. The instrument controlling device includes a storing portion that stores instrument information for each instrument, a receiving portion that receives, as an alert event, a phenomenon that has occurred in one of the instruments, a first evaluating portion that evaluates whether or not the address of the instrument that produced the alert event matches any of the addresses included in the configuration information that is stored in the storing portion if the alert event received by the receiving portion is an installation event that is generated when an instrument is connected to the system, a second evaluating portion that evaluates whether or not instrument identifying information that identifies that instrument, included in the instrument information for the instrument with the match matches instrument identifying information that is included in the alert event, if it is concluded by the first evaluating portion that the address of the instrument that produced the alert event matches one of the addresses in the instrument information, a selection requesting portion that requests the administrator to select whether or not to update the instrument information using the instrument identifying information that is included in the alert event when it is concluded by the second evaluating portion that the instrument identifying information included in the instrument information does not match instrument identifying information that is included in the alert event, and an updating portion that updates the instrument information using the instrument identifying information that is included in the alert event, if the instruction selected by the administrator is an instruction for updating the instrument information.

Moreover, an instrument controlling method according to the present invention, for controlling instrument information pertaining to a plurality of instruments that are connected to a system that is subject to control, includes a receiving step for receiving, as an alert event, a phenomenon that has occurred in one of the instruments, a first evaluating step for evaluating whether or not the address of the instrument that produced the alert event matches any of the addresses included in the configuration information that is stored in a storing portion for storing the device information for individual devices if the alert event received in the receiving step is an installation event that is generated when an instrument is connected to the system, a second evaluating step for evaluating whether or not instrument identifying information that identifies that instrument, included in the instrument information for the instrument with the match matches instrument identifying information that is included in the alert event, if it is concluded by the first evaluating step that the address of the instrument that produced the alert event matches one of the addresses in the instrument information, a selection requesting step for requesting the administrator to select whether or not to update the instrument information using the instrument identifying information that is included in the alert event when it is concluded by the second evaluating step that the instrument identifying information included in the instrument information does not match instrument identifying information that is included in the alert event, and an updating step for updating the instrument information using the instrument identifying information that is included in the alert event, if the instruction selected by the administrator is an instruction for updating the instrument information.

With this structure, when it is concluded by the first evaluating portion that the address of an instrument that has produced an alert event matches an address in instrument information that has been stored, and it is concluded by the second evaluating portion that the instrument identifying information that is stored does not match the instrument identifying information in the alert event, then it is concluded by the selection requesting portion 14 that the instrument has been swapped, making it possible to provide notification to the administrator, and making it possible for the instrument information to be updated, by the updating portion 15, using the instrument identifying information of the installation event, if updating is selected by the administrator.

The present invention makes it possible to provide an instrument controlling device and instrument controlling method able to update, easily and promptly, the instrument information controlled by the system even when an instrument has been swapped without notifying the administrator.

BRIEF DESCRIPTIONS OF THE DRAWINGS

FIG. 2 is a diagram illustrating a data structure for the structural information table shown in FIG. 1.

DETAILED DESCRIPTION

An example according to the present invention will be explained below in reference to the drawings. However, the example explained below is no more than an illustration, and does not exclude various modifications and applications to technologies not explicated below. That is, the present invention can be embodied in a variety of modified forms, in a scope that does not deviate from the spirit and intent thereof.

Figure 1:
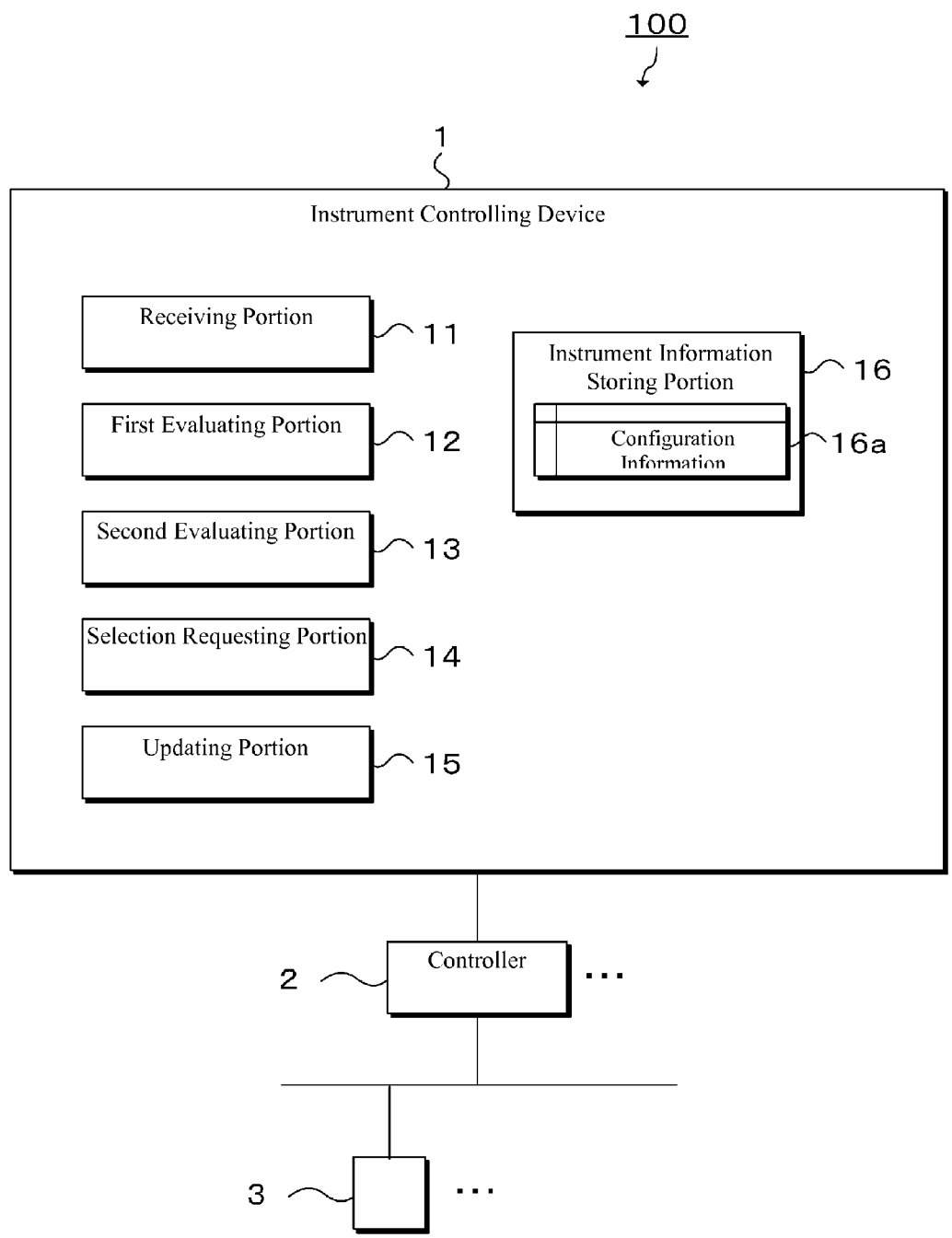
FIG. 1 is a diagram illustrating a structure for an instrument controlling system including an instrument controlling device according to an example.

FIG. 1 is a diagram illustrating a schematic structure for an instrument controlling system that includes an instrument controlling device according to the example. As illustrated in FIG. 1, the instrument controlling system 100 includes an instrument controlling device 1, one or more controllers 2, and one or more devices 3. The controller 2 and the device 3 are "instruments" in a hierarchical relationship, where the controller 2 is located on a higher hierarchical level and the device 3 is located hierarchically below the controller 2.

The device 3 is an instrument that is disposed within a plant, and has a function for two-way communication with the controller 2 through, for example, a fieldbus. A "fieldbus" is a network with a communication protocol enabling two-way communication through digital signals, where the communication specifications have been standardized as the "Foundation Fieldbus" by the Fieldbus Foundation®.

The device 3 may be one of a variety of sensor instruments for detecting, for example, flow rates, pressures, temperatures, or the like, or one of a variety of actuators for operating a fan, a pump, or a valve positioner for controlling any of a variety of valves such as a flow rate controlling valve, a pressure controlling valve, or the like.

The controller 2 is an instrument for the overall control of the device 3 that is positioned hierarchically thereunder. The controller 2 controls the valve positioner based on, for example, a measured value for a flow rate or pressure, from the sensor instrument, to adjust the degree of opening, or the like, of a valve that is disposed within a pipe.

The instrument controlling device 1 is a device for controlling instrument information of controllers 2 and devices 3. The instrument controlling device 1 physically includes, for example, a controlling device (not shown) such as, for example, a CPU (Central Processing Unit), a storage device (not shown) such as a memory or an HDD (Hard Disk Drive), an inputting device (not shown), and a displaying device (not shown). The storage device is provided with, for example, a configuration information table 16*a* as various types of tables for storing instrument information.

The configuration information table 16*a* stores configuration information regarding the configurations of the controllers 2 and the devices 3. The data structure of the configuration information table 16*a* will be explained in reference to FIG. 2. The configuration information table 16*a* has, for example, an Instrument Identifying Information field, an Address Information field, a Revision No. field, and a Parameter Field as data fields.

The Instrument Identifying Information field stores instrument identifying information that specifies the controllers 2 and devices 3 uniquely. The Address Information field stores addresses indicating the locations of the controllers 2 and the devices 3 within the system. The Revision No. field stores a revision number that is incremented each time there is a change in a parameter that is stored in the Parameter field. The Parameter field stores a plurality of sets of parameter IDs, which uniquely specify parameters, and the parameter values thereof. The combinations of the parameter IDs and the parameter values configure the parameter setting information in relation to the details of the settings of the parameters. Moreover, a revision number and parameter setting information are defined as parameter information regarding a parameter.

Here the controllers 2 and the devices 3 produce a variety of alert events. An alert event may be, for example, an installation event, a removal event, an update event, or an alarm event. An installation event is an alert event that is produced when a controller 2 or a device 3 is connected to the system. A removal event is an alert event that is produced when a controller 2 or a device 3 is removed from the system. An update event is an alert event that is produced when a parameter has been changed for a controller 2 or a device 3. An alarm event is an alert event for providing notification of an alarm that has been produced by a controller 2 or a device 3.

As illustrated in FIG. 1, the instrument controlling device 1, functionally, has, for example, a receiving portion 11, a first evaluating portion 12, a second evaluating portion 13, a selection requesting portion 14, and an updating portion 15.

The receiving portion 11 receives, as alert events, phenomena that occur in any of the instruments.

If the alert event received by the receiving portion 11 is an installation event, then the first evaluating portion 12 evaluates whether or not the address of the instrument that produced this alert event matches any of the addresses stored in the configuration information table 16*a*.

If it is concluded by the first evaluating portion 12 that the address of the instrument that produced the alert event matches one of the addresses stored in the configuration information table 16*a*, then the second evaluating portion 13 evaluates whether or not the instrument identifying information corresponding to the matching address that is stored in the configuration information Table 16*a* matches instrument identifying information that is included in the alert event.

If the conclusion by the second evaluating portion 13 is that the instrument identifying information that is stored in the configuration information table 16*a* does not match instrument identifying information that is included in the alert event, then the selection requesting portion 14 requests, from the administrator, a selection of whether or not to update the configuration information in the configuration information Table 16*a* using the instrument identifying information that is included in the alert event.

In other words, if the conclusion by the second evaluating portion 13 is that the instrument identifying information that is stored in the configuration information table 16a does not match instrument identifying information that is included in the alert event, then selection requesting portion 14 concludes that the instrument has been swapped, and the administrator is notified.

If the instruction selected by the administrator is an instruction to update the instrument information, then updating portion 15 updates the configuration information of the configuration information Table 16a using the instrument identifying information that is included in the alert event.

Figure 3:
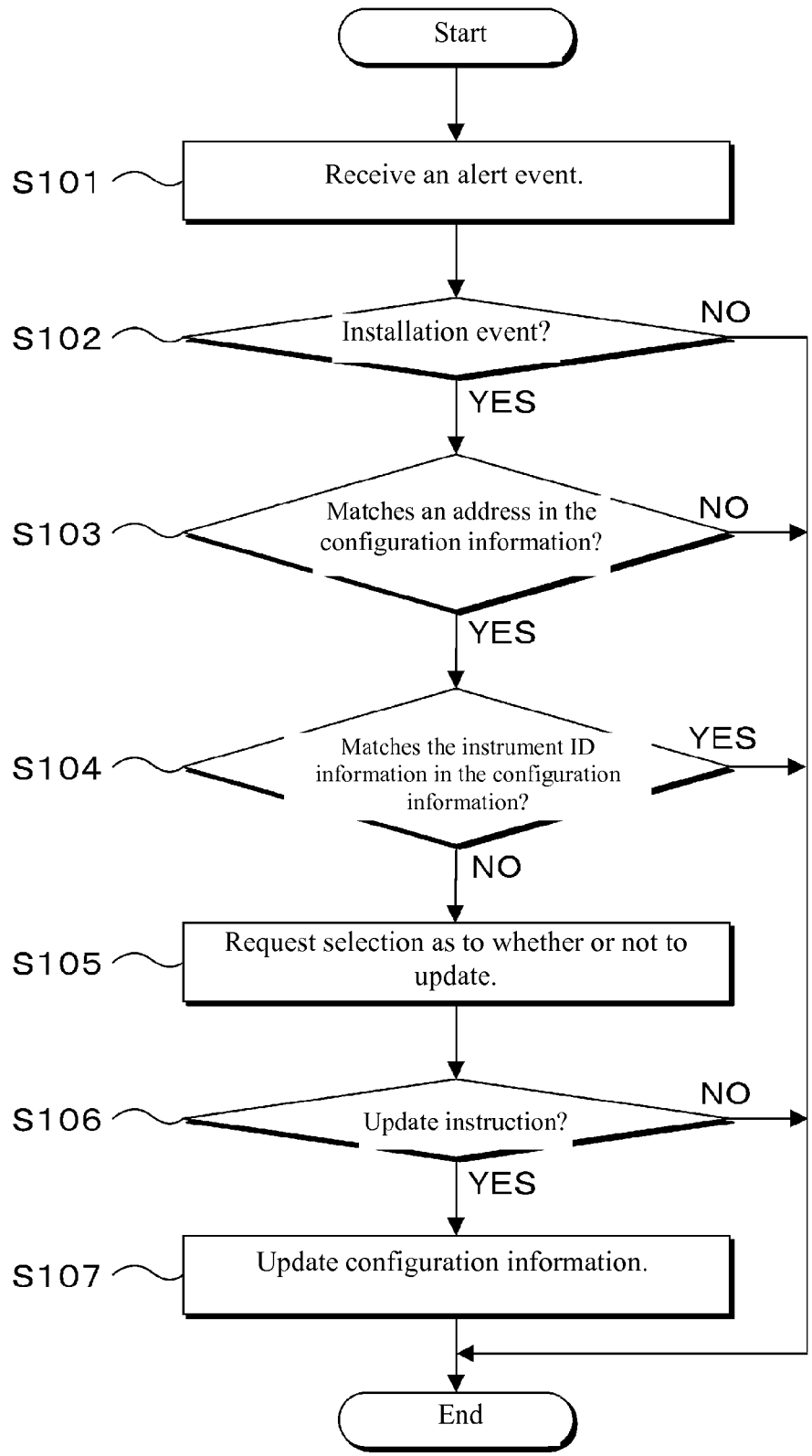
FIG. 3 is a flowchart for explaining the operation of the instrument controlling device according to the example.

FIG. 3 will be referenced next to explain the operation when updating the configuration information in the instrument controlling device 1.

First, the receiving portion 11 receives, as an alert event, a phenomenon that has occurred in any of the instruments (Step S101).

Following this, the first evaluating portion 12 evaluates whether or not the alert event received in Step S101 is an installation event (Step S102). If the evaluation is NO (Step S102: NO), then the current operation is terminated.

On the other hand, if it is concluded in the evaluation in Step S102 that the alert event is an installation event (Step S102: YES), then the first evaluating portion 12 evaluates whether or not the address of the instrument that produced the alert event matches any of the addresses stored in the configuration information table 16a (Step S103). If the evaluation is NO (Step S103: NO), then the current operation is terminated.

On the other hand, if it is concluded in the evaluation in Step S103 that the address of the instrument that produced the alert event matches one of the addresses stored in the configuration information table 16a (Step S103: YES), then the second evaluating portion 13 evaluates whether or not the instrument identifying information corresponding to the matching address that is stored in the configuration information Table 16a matches instrument identifying information that is included in an alert event (Step S104). If the evaluation is YES (Step S104: YES), then the current operation is terminated.

On the other hand, if, in the evaluation in Step S104, the conclusion is that the instrument identifying information that is stored in the configuration information table 16a does not match instrument identifying information that is included in the alert event (Step S104: NO), then the selection requesting portion 14 requests, from the administrator, a selection of whether or not to update the configuration information Table 16a using the instrument identifying information that is included in the alert event (Step S105).

If the instruction selected by the administrator is not an instruction to update the configuration information Table 16a (Step S106: NO), then the current operation is terminated.

On the other hand, if the instruction selected by the administrator is an instruction to update the configuration information Table 16a (Step S106: YES), then the updating portion 15 updates the configuration information of the configuration information Table 16a, using the instrument identifying information that is included in the alert event (Step S107). After this, processing returns to the main routine.

As described above, given the instrument controlling device 1 in the present example, the first evaluating portion 12 makes it possible to evaluate, when an installation event has been received, whether or not the address of the instrument that produced the installation event is stored in the configuration information table 16a, and the second evaluating portion 13 makes it possible, when there is a match between both addresses, to evaluate whether or not the instrument identifying information that is included in the configuration information of the configuration information Table 16a corresponding to the address of the instrument that produced the installation event matches the instrument identifying information from the installation event. Moreover, the selection requesting portion 14 makes it possible to request, from an administrator, a selection as to whether or not to use the device identifying information from the installation event to update the configuration information of the configuration information table 16a when there is no match between the instrument identifying information of both, and the updating portion 15 makes it possible to update the configuration information in the configuration information table 16a, using the instrument identifying information included in the installation event, when there the instruction selected by the administrator is an instruction for updating the configuration information.

This makes it possible to update the configuration information that is controlled on the system side with the configuration information of an instrument after swapping, even when the instrument has been swapped on the production floor side without notifying the administrator.

Note that while in the example set forth above the second evaluating portion 13 performed a comparison of the instrument identifying information, the information that is compared is not limited to the instrument identifying information that is used as an illustrative example in the present example, insofar as it is information that is able to identify the instrument. For example, information that identifies an instrument through a combination of, for example, a device manufacturer ID, a device type ID, and a device revision may be used.

While in the example set forth above an instrument that has a function for two-way communication with a controller through a Fieldbus was used as an example of the device 3, the instruments to which the present invention can be applied are not limited thereto. For example, an instrument that includes an HART (Highway Addressable Remote Transducer) communication function (hereinafter termed a "HART communication-compatible instrument") may be used as the device 3.

The invention claimed is:

1. An instrument controlling device controlling instrument information pertaining to a plurality of instruments that are connected to a system that is subject to control, comprising:

a non-transient storage storing instrument information comprising addresses and instrument identifying information for each instrument of the plurality of instruments;

a receiver receiving, as an alert event, a phenomenon that has occurred in one instrument of the plurality of instruments;

a first evaluator evaluating whether or not the address of the instrument that produced the alert event matches any of the addresses included in the instrument information that is stored in the non-transient storage if the alert event received by the receiver is an installation event that is generated when an instrument is connected to the system;

a second evaluator evaluating whether or not instrument identifying information that identifies that instrument, included in the instrument information for the instrument matches instrument identifying information that is included in the alert event, if it is concluded by the first evaluator that the address of the instrument that produced the alert event matches one of the addresses in the instrument information;

a selector requesting an administrator to select whether or not to update the instrument information using the instrument identifying information that is included in the alert event when it is concluded by the second evaluator that the instrument identifying information included in the instrument information does not match instrument identifying information that is included in the alert event; and an updater updating the instrument information using the instrument identifying information that is included in the alert event, if the instruction selected by the administrator is an instruction for updating the instrument information.

2. An instrument controlling method controlling instrument information pertaining to a plurality of instruments that are connected to a system that is subject to control, comprising:

receiving, as an alert event, a phenomenon that has occurred in one instrument of the plurality of instruments;

a first evaluation evaluating whether or not an address of the instrument that produced the alert event matches any addresses included in instrument information that is stored in a storage storing addresses and instrument identifying information of the plurality of instruments if the alert event received in the receiving is an installation event that is generated when an instrument is connected to the system;

a second evaluation evaluating whether or not instrument identifying information that identifies that instrument, included in the instrument information for the instrument matches instrument identifying information that is included in the alert event, if it is concluded by the first evaluation concludes that the address of the instrument that produced the alert event matches one of the addresses in the instrument information;

requesting an administrator to select whether or not to update the instrument information using the instrument identifying information that is included in the alert event when it is concluded by the second evaluation that the instrument identifying information included in the instrument information does not match instrument identifying information that is included in the alert event; and updating the instrument information using the instrument identifying information that is included in the alert event, if the instruction selected by the administrator is an instruction for updating the instrument information.

* * * * *